Figure 1:
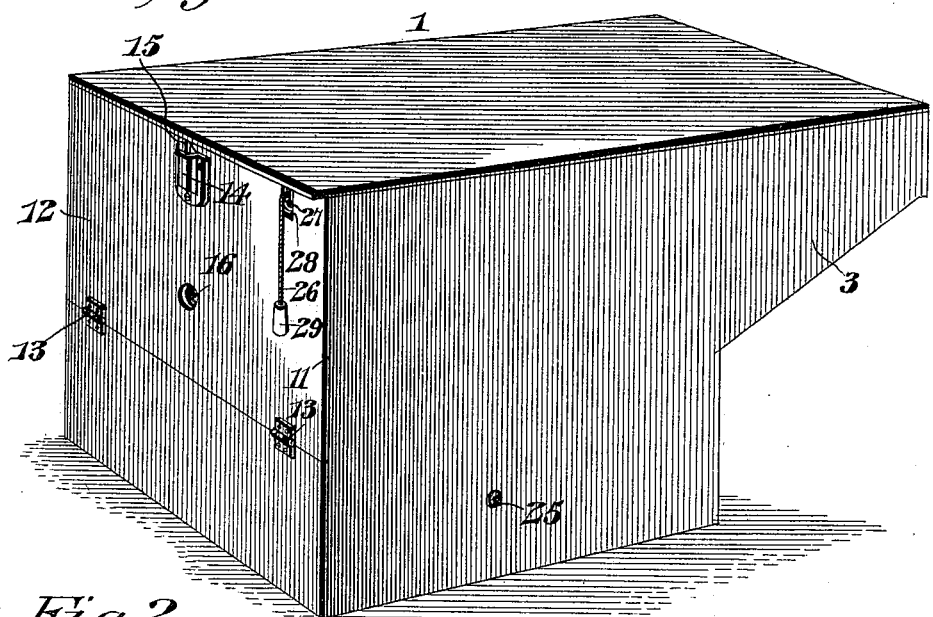

No. 621,499. Patented Mar. 21, 1899.
G. I. LYTLE.
POULTRY NEST BOX.
(Application filed Oct. 17, 1898.)
(No Model.) 2 Sheets—Sheet 1.

Witnesses George I. Lytle Inventor
By his Attorneys,

No. 621,499. Patented Mar. 21, 1899.
G. I. LYTLE.
POULTRY NEST BOX.
(Application filed Oct. 17, 1898.)

(No Model.) 2 Sheets—Sheet 2.

Witnesses
Jas. K. McCathran
D. T. ...

George I. Lytle Inventor
By his Attorneys,
C. A. Snow & Co.

THE NORRIS PETERS CO., PHOTO-LITHO., WASHINGTON, D. C.

UNITED STATES PATENT OFFICE.

GEORGE I. LYTLE, OF WEST SUPERIOR, WISCONSIN.

POULTRY-NEST BOX.

SPECIFICATION forming part of Letters Patent No. 621,499, dated March 21, 1899.

Application filed October 17, 1898. Serial No. 693,774. (No model.)

*To all whom it may concern:*

Be it known that I, GEORGE I. LYTLE, a citizen of the United States, residing at West Superior, in the county of Douglas and State of Wisconsin, have invented a new and useful Poultry-Nest Box, of which the following is a specification.

This invention relates to poultry culture; and it has for its object to provide a new and useful poultry-nest box designed for housing therein a hen's nest and constructed with special reference for keeping tally of the egg-producing capacity of the fowl as well as the pedigree for breeding purposes.

In the successful and practical culture of poultry the experienced poultryman finds it necessary to keep a proper record not only of the egg-producing capacity of the poultry, but also of the best breeders; and the present invention is primarily designed to assist the poultryman in keeping such record.

It is well understood that in every flock there are barren hens which produce no eggs, but which can only be maintained at the same expense as those hens which are desirable to keep on account of their prolific laying qualities.

The present invention enables the poultryman to readily detect the barren hens, so that the same can be disposed of, as well as to determine the exact egg-producing capacity of each hen, as it is also well known that in a flock there will be found a great difference in the number of eggs laid by different hens, some hens producing two hundred or more eggs a year, while others will only produce fifty eggs a year or even less, and it is never desirable or profitable to keep the latter class of fowl.

Furthermore, the present invention enables the poultryman to use only his most profitable fowls for breeding purposes and will also enable him to have on record the exact egg-producing capacity of each hen offered for sale, and thereby obviate the necessity of separately penning up "prize" fowl in pens, as has heretofore been the custom.

With these and other objects in view, which will readily appear as the nature of the invention is better understood, the same consists in the novel construction, combination, and arrangement of parts, hereinafter more fully described, illustrated, and claimed.

While the invention is necessarily susceptible to modification without departing from the spirit thereof, still the preferred embodiment is shown in the accompanying drawings, in which—

Figure 2:
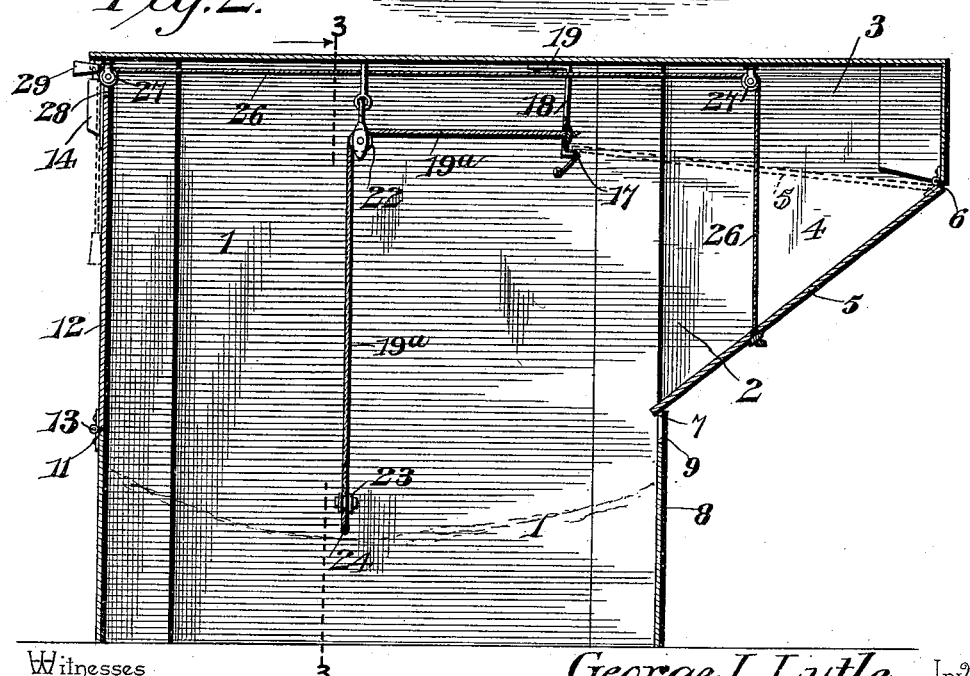
Figure 3:
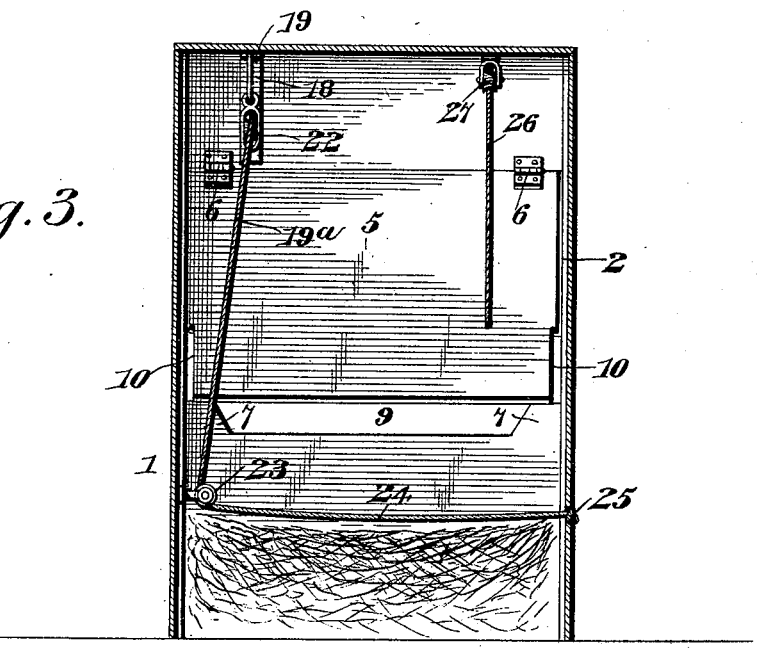
Figure 4:
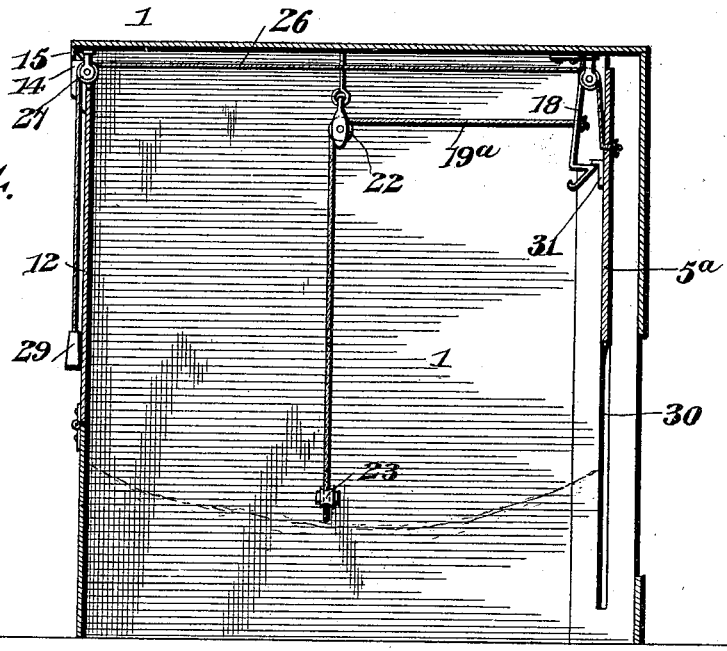

Figure 1 is a perspective view of a nest-box constructed in accordance with this invention. Fig. 2 is a vertical longitudinal sectional view thereof. Fig. 3 is a transverse sectional view on the line 3 3 of Fig. 2. Fig. 4 is a longitudinal sectional view showing a modification in which the drop-door is arranged to work in vertically-disposed guides.

Referring to the accompanying drawings, the numeral 1 designates an approximately rectangular box-body constructed of side, top, and end boards assembled together in box form and secured together at their meeting edges by screws or other suitable fastenings; and in the present invention the said rectangular box-body is preferably entirely open at the bottom, so that the nesting material will be supported directly on the floor or the platform on which the box is placed, so that a cleaning of the box proper is obviated.

The box-body 1 is constructed sufficiently large so as to afford ample room to the hen occupying the same, and at its rear end the body is provided with a fowl passage or opening 2, extending the full width thereof and of a sufficient height to permit the free entry and exit of the hen. In the preferred form of the invention the body 1 is provided at its rear upper end with an offset door-housing 3, overhanging and projecting beyond the passage or opening 2 and having inclined or tapering side portions 4, which have their inclined edges conform to the angle of the hinged drop-door 5 when the latter is in its closed position.

The drop-door 5, which is arranged within the housing extension at the rear end of the box-body, is hinged at its upper edge by means of the hinges 6 to the upper end portion of the housing extension 3 and is adapted to have its unpivoted end normally rest on the inclined rest-shoulders 7, formed at opposite points on the upper edge of the rear lower end board 8 at the rear end of the body below the door-housing extension thereof. The said rear lower end board 8 is further provided in its upper edge, between the shoulders 7, with a cut-away portion 9, which affords ventilation for the interior of the box when the door 5 is closed, and it will be observed that the said door is provided with cut-away portions 10 at its edges, so as to readily clear the vertical cleats within the box and which form a part of the frame structure thereof.

At its front end the box-body 1 is provided with an enlarged front-door opening 11, which is covered and uncovered by a front door 12, hinged at its lower edge by means of the hinges 13 to the lower edge of the opening 11 and carrying at its upper swinging edge a catch 14, adapted to engage a suitable keeper 15, fitted to the front top edge of the box-body, and the said front door 12 is provided at a suitable point therein with a peep-hole 16, through which the interior of the box may be readily observed without opening the said door 12.

The rear drop-door 5, which covers and uncovers the passage or opening 2 for the hen, is adapted to have its free edge engage with the lower shouldered end 17 of a spring-catch arm 18, secured fast at its upper end, as at 19, to the top of the box-body, so as to depend from such top and provide for supporting the drop-door in its open position, so as to allow a hen a free entry through the passage or opening 2. The spring-catch arm 18 has attached thereto at an intermediate point one end of a trip-cord 19ª, passing around suitably-arranged pulleys 22 and 23, supported, respectively, by the top and one side of the box-body and having its lower portion (designated by the number 24) extending transversely across the lower portion of the box-body and attached, as at 25, to the side of the box-body opposite the pulley 23. The transverse portion 24 of the trip-cord 19ª lies directly in the path of the hen as she passes to the nest formed of the nesting material, which is placed within the open bottom of the box-body. So, therefore, the entering hen will either step or sit on the lower transverse portion 24 of the trip-cord, and thereby disengage the spring-catch 18, so as to permit the drop-door 5 to automatically close and cut off escape through the passage or opening 2.

The drop-door 5 is set to an open position in engagement with the catch 18 by means of a setting-cord 26, arranged inside of the box-body and passing over spaced guide-pulleys 27, secured to the top of the box, and the front one of which guide-pulleys lies within a notch 28, formed in the top edge of the front door 12, so that the front end of the setting-cord will be exposed in front of the said door 12. The said front end of the cord 26 carries a pull-knob 29, also forming an indicator, and is attached at its rear end to the drop-door 5, so that by pulling on the knob 29 the said drop-door may be set to its open position.

A modification of the manner of mounting the drop-door is shown in Fig. 4 of the drawings, in which modification the housing extension 3 is dispensed with and the door (designated by the numeral 5ª) is arranged vertically and has its side edges mounted to slide in the vertically-disposed guide grooves or ways 30, arranged at opposite inner sides of the box-body and adjacent to the fowl passage or opening 2. In this modification of the door-mounting it is only necessary to provide the door 5ª with a keeper-plate 31, which engages with the shoulder of the spring-catch arm 18 to hold the door elevated in its open position.

In the use of the box the straw or other nesting material is placed in the bottom thereof and the door for the passage or opening 2 is opened, so as to allow the hen a free entry. When the hen enters, she causes the drop-door to close in the manner already explained, and she is then confined until released by the attendant, who notes her number and credits her with the egg laid, and experience has taught that every two hours is sufficiently often to attend the nest. It will be observed that the knob 29 when hanging a material distance down in front of the door 12 serves as an indicator to indicate to the attendant that the nest within the box is not occupied, while, on the other hand, when the said knob is drawn up to the front pulley 27 it indicates that is within the box on the nest. In this way a complete tally of the hens can be easily kept and a reliable record of their egg-producing capacity and pedigree maintained.

In the use of the invention the boxes are arranged in buildings with or without hallways; but at all times the boxes must be arranged with sufficient space at their rear ends to leave a free passageway for the poultry.

Changes in the form, proportion, and the minor details of construction may be resorted to without departing from the principle or sacrificing any of the advantages of this invention.

Having thus described the invention, what is claimed as new, and desired to be secured by Letters Patent, is—

1. In a poultry-nest box, a box-body having a front door, and at its rear a fowl passage or opening, a drop-door mounted within the rear end of the box-body and arranged to cover and uncover said passage or opening, a catch for holding said door open, a trip connection, operated by an entering fowl, for releasing said catch, and a manually-controlled setting connection for opening the door, having its operating portion exposed in front of the front door to indicate the presence or absence of a fowl within the box, substantially as set forth.

2. In a poultry-nest box, a box-body having a fowl passage or opening, a door arranged to cover and uncover said passage or opening, means for causing said door to be closed only upon the entrance of a fowl, and a manually-controlled setting connection for opening the door, said setting connection having its operating portion exposed at the front of the box to form an indicator to apprise the attendant of the presence or absence of a fowl, substantially as set forth.

3. In a poultry-nest box, a box-body having a fowl passage or opening, a gravity drop-door arranged to cover and uncover said passage or opening, a trip device for permitting the door to close, said device having an operating portion extending transversely of the box-body in the path of an entering fowl, and a manually-controlled setting connection for opening the door having its operating portion disposed at the front of the box to form an indicator, substantially as set forth.

4. In a poultry-nest box, a box-body having a fowl passage or opening, a gravity drop-door arranged to cover and uncover said passage or opening, a fixedly-positioned spring-catch having an engagement with said door to hold the same open, a trip-cord connected at one end with said spring-catch and having its other end portion guided transversely across the nest-holding portion of the box, and a manually-controlled setting-cord supported within the top portion of the box-body and having a connection at one end with said door, the other end of said setting-cord carrying a hand-knob hanging and exposed at the front of the box to form an indicator, substantially as set forth.

5. In a poultry-nest box, the box-body having a front door provided with a peep-hole, a rear fowl passage or opening, a housing extension overhanging said opening, and a ventilating-space at the lower edge of said opening, a swinging drop-door mounted within said housing extension, a trip device for holding the door open and having an operating portion extending transversely of the box-body, and a manually-controlled setting connection for the door having its operating portion disposed in front of the front door, to form an indicator, substantially as set forth.

In testimony that I claim the foregoing as my own I have hereto affixed my signature in the presence of two witnesses.

GEORGE I. LYTLE.

Witnesses:
   W. H. GLASS,
   COURTNEY T. GLASS.